(12) United States Patent
Takaki

(10) Patent No.: US 8,266,545 B2
(45) Date of Patent: Sep. 11, 2012

(54) DEVICE FOR BIFURCATED DISPLAY OF REPLAY MENUS SEPARATING DIGITAL MEDIA FILES BY FILE FORMATS

(75) Inventor: Kentaro Takaki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 550 days.

(21) Appl. No.: 12/256,073

(22) Filed: Oct. 22, 2008

(65) Prior Publication Data

US 2009/0113343 A1 Apr. 30, 2009

(30) Foreign Application Priority Data

Oct. 24, 2007 (JP) .................................. 2007-276583

(51) Int. Cl.
*G06F 3/048* (2006.01)
*G06F 3/00* (2006.01)
(52) U.S. Cl. ........................................ 715/810; 715/716
(58) Field of Classification Search .................. 715/810, 715/838, 716
See application file for complete search history.

(56) References Cited

U.S. PATENT DOCUMENTS

| 6,574,424 | B1* | 6/2003 | Dimitri et al. ................ 386/248 |
| 2002/0186258 | A1* | 12/2002 | Shibata ........................ 345/838 |
| 2003/0191623 | A1* | 10/2003 | Salmonsen .................... 703/24 |
| 2004/0024580 | A1* | 2/2004 | Salmonsen et al. ............. 703/27 |
| 2004/0125144 | A1* | 7/2004 | Yoon ............................. 345/769 |
| 2005/0152683 | A1* | 7/2005 | Ryu .............................. 386/95 |
| 2006/0026162 | A1* | 2/2006 | Salmonsen et al. ............. 707/10 |
| 2006/0044976 | A1* | 3/2006 | Ishiguchi ..................... 369/53.2 |
| 2006/0129909 | A1* | 6/2006 | Butt et al. ................... 715/500.1 |
| 2006/0161635 | A1* | 7/2006 | Lamkin et al. ................ 709/217 |
| 2007/0081797 | A1* | 4/2007 | Tanaka .......................... 386/125 |
| 2007/0174545 | A1* | 7/2007 | Okada et al. ................. 711/112 |
| 2007/0174791 | A1* | 7/2007 | Park et al. .................... 715/838 |
| 2007/0233740 | A1* | 10/2007 | Nichols et al. ............ 707/104.1 |
| 2008/0120652 | A1* | 5/2008 | Guzman et al. ................. 725/59 |

FOREIGN PATENT DOCUMENTS

| JP | 2002049634 | 2/2002 |
| JP | 2007049733 | 2/2007 |
| JP | 2007080359 | 3/2007 |

OTHER PUBLICATIONS

Microsoft Computer Dictionary, 5th edition, Microsoft Press, Copyright 2002, ISBN 0-7356-1495-4, pp. 334 and 654.*

* cited by examiner

*Primary Examiner* — Doon Chow
*Assistant Examiner* — Wilson Varga
(74) *Attorney, Agent, or Firm* — Pillsbury Winthrop Shaw Pittman, LLP

(57) ABSTRACT

A replay device includes a management means which manages all of the files stored upon a medium by separating them into first files and second files. And this replay device also includes an output means which creates and outputs a first menu screen upon which a list of the first files is shown, and a second menu screen upon which a list of the second files is shown, on the basis of the file management by the management means. Moreover, this replay device also includes a selection means which receives a selection of one of the first files to be replayed from the first menu screen, or receives a selection of one of the second files to be replayed from the second menu screen. And the replay device also includes a replay means which replays the first file or the second file which has been selected by the selection means.

2 Claims, 5 Drawing Sheets

DEVICE FOR BIFURCATED DISPLAY OF REPLAY MENUS SEPARATING DIGITAL MEDIA FILES BY FILE FORMATS

CROSS REFERENCE

This Nonprovisional application claims priority under 35 U.S.C. §119(a) on Patent Application No. 2007-276583 filed in Japan on Oct. 24, 2007, the entire contents of which are hereby incorporated by reference.

BACKGROUND OF THE INVENTION

The present invention relates to a replay device which replays image files in a format in which it is defined that a list of image files is displayed before replaying an image file, and after replay of an image file has ended.

In the prior art, a replay device has been developed which replays DMF files in which image data is recorded in the DivX Media Format (hereinafter termed DMF) of the DivX company. Such a DMF file is one type of DivX file, and is a file in which at least image data is recorded. Moreover, in DMF, it is defined that a list of the DMF files is necessarily displayed before replay of a DMF file is performed, and after such replay has ended.

Due to this, with this prior art replay device, when a medium is loaded upon which files in some format other than that of DMF files are recorded, then a list of these files in that format other than the DMF file format is displayed. At this time, when the user selects a DMF file and replays it, when the replaying of this DMF file ends, the system displays a menu screen in which only the DMF files are shown, even though files in other formats are recorded upon the medium. Accordingly, having once replayed a DMF file, the user is not able to replay any file other than a DMF file, unless he turns the power off and on again.

It should be understood that in Japanese Laid-Open Patent Publication 2007-049733 there is disclosed a replay device which reads the logical bits from a DivX DVD, and replays a video clip before replaying that DVD and after replay thereof has ended. Moreover in Japanese Laid-Open Patent Publication 2007-080359 there is disclosed a replay device which displays file formats which can be replayed, in order to show the user its function of replaying data in a plurality of file formats. And in Japanese Laid-Open Patent Publication 2002-049634 there is disclosed an image search output method which, in order to be able to cope with image files in new formats, searches for images which are recorded upon a medium, and creates a list of image files.

However, with such prior art replay devices, in the situation in which DMF files and files in other formats are mixed together, a list of the DMF files and of the files in other formats has been displayed. Due to this, it has been necessary for the user to select a single file in circumstances in which it has been difficult for him to identify whether or not the files are DMF files. However, if the user mistakenly selects a DMF file, then, a prior art replay device enters into the mode described above in which it can only play DMF files. In this case, unless the user turns the power supply off and on again, he cannot replay any files other than DMF files. Accordingly, with replay devices according to the prior art, the convenience of use from the point of view of the user has been poor.

Thus, the object of the present invention is to provide a replay device which, by displaying a list of image files before replay of an image file and after replay has ended, provides an output which enables the user to identify in a simple and easy manner the files which are formatted in some defined format, and the files in other formats.

SUMMARY OF THE INVENTION

The replay device according to the present invention includes a management means which manages all of the files stored upon a medium by separating them into first files and second files. The medium may be, for example, a magnetic disk, an optical disk, or a semiconductor memory. And these files may generically be audio files, moving image files, or still image files. Furthermore, the first files are files in which image data is recorded in a first format in which it is defined that a list of the first files is to be displayed before replay of a first file, and after replay thereof has ended. And the second files are files in which data is recorded in a second format other than the first format.

And this replay device also includes an output means which creates and outputs at least one of a first menu screen upon which a list of the first files is shown, and a second menu screen upon which a list of the second files is shown, on the basis of the file management by the management means. With this structure, the first menu screen and the second menu screen which are outputted from the output means are displayed by the display device which is connected to the replay device. Due to this, the list of the first files and the list of the second files are displayed separately.

Moreover, this replay device also includes a selection means which receives a selection of one of the first files to be replayed from the first menu screen, or receives a selection of one of the second files to be replayed from the second menu screen.

And the replay device also includes a replay means which replays the first file or the second file which has been selected by the selection means.

DETAILED DESCRIPTION OF THE INVENTION

Figure 1:
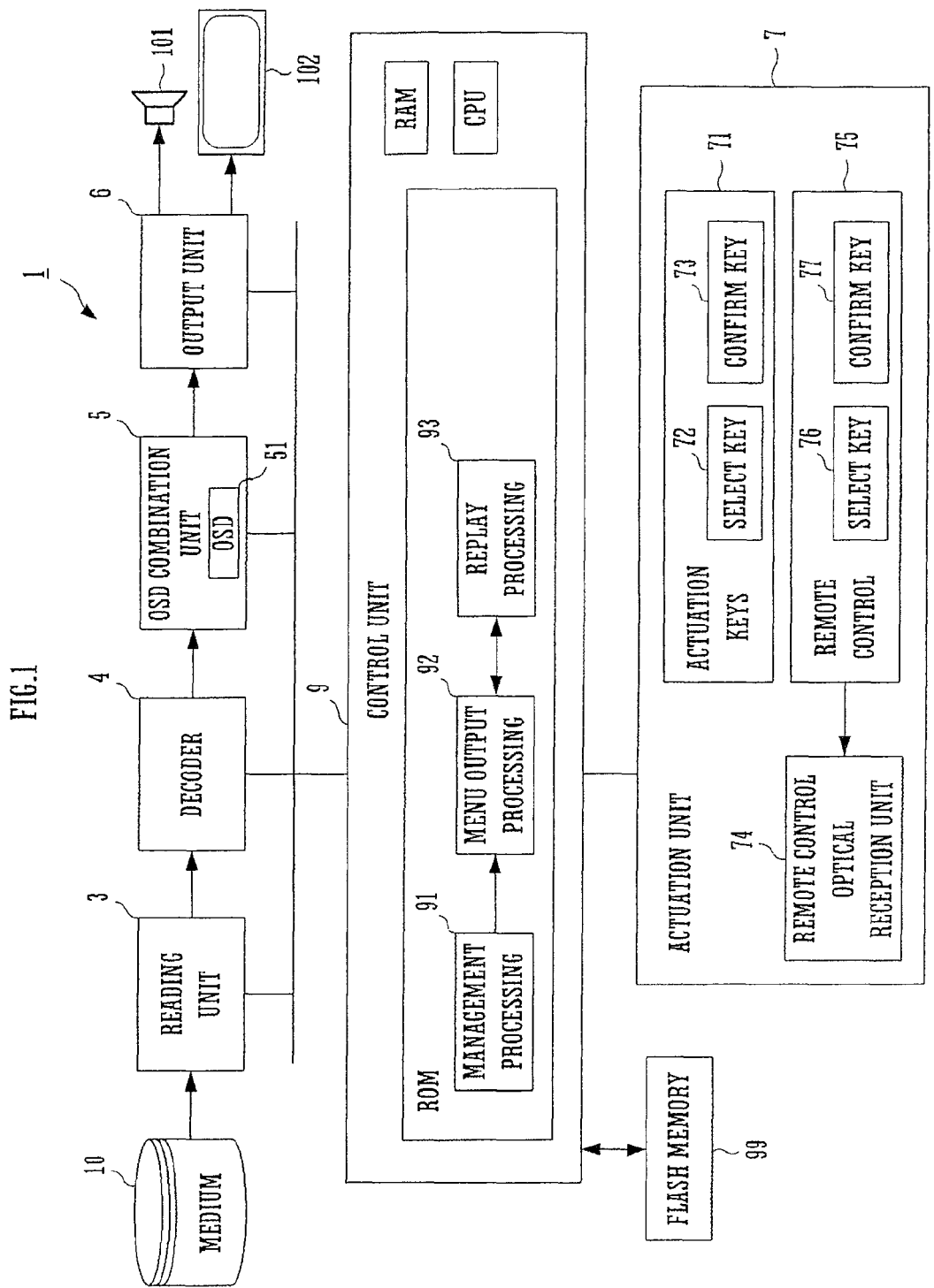
FIG. 1 is a block diagram showing the structure of a replay device according to an embodiment of the present invention.

FIG. 1 is a block diagram showing the structure of the main portion of a replay device which is an embodiment of this invention. This replay device 1 comprises a reading unit 3, a decoder 4, an OSD combination unit 5, an output unit 6, an actuation unit 7, and a control unit 9. And the replay device 1 is connected to a display unit 102 and a speaker 101. This replay device 1 is a device which replays a file recorded upon a medium 10 from the display unit 102 and the speaker 101. For example, the replay device 1 may be a solid-state memory player such as a MP3 player or the like, or a CD player, a DVD player, a DVD recorder, a hard disk recorder which can output an image signal. Moreover, the medium 10 may be, for example, a hard disk, an optical disk such as a DVD or a Blu-ray disk or the like, or a semiconductor memory such as a flash memory or the like. And the term "file" here is a generic term for an audio file, a moving video file, or a still image file.

It should be understood that the control unit 9 corresponds to the "management means" of the Claims. Moreover, the OSD combination unit 5 and the output unit 6 correspond to the "output means" of the Claims. Furthermore, the actuation unit 7 corresponds to the "selection means" of the Claims. Even further, the actuation unit 7 corresponds to the "initial setting means" of the Claims. Finally, the reading unit 3, the decoder 4, and the output unit 6 correspond to the "replay means" of the Claims.

The reading unit 3 reads data which is recorded upon the medium 10, and outputs a read signal representative thereof to the decoder 4. For example, if the medium 10 is a hard disk, then the reading unit 3 is a hard disk drive. Furthermore, if the medium 10 is a memory card, then the reading unit 3 is a memory card reader. And, if the medium 10 is a DVD or the like, then the reading unit 3 is an optical disk drive.

On the medium 10, there are recorded a DMF file (which corresponds to the "first file" of the Claims), and a second file which may be encoded in any one of the MPEG2 format, the MPEG3 format, or the WAV format, all of which are per se known.

The decoder 4 separates the audio data and the image data from the read signal outputted by the reading unit 3 from one another. Moreover, the decoder 4 decodes and outputs these data streams. The decoder 4 outputs the image data to the OSD combination unit 5. And the decoder 4 outputs the audio data to the output unit 6.

The OSD combination unit 5 stores in advance an OSD (On Screen Display) 51 which consists of characters and/or the like. This OSD 51 not only may consist of characters or a drawing, but may also be, for example, an initial setting menu screen, a menu screen 511 on a tab 53 or a menu screen 512 on a tab 52 (described hereinafter with reference to FIG. 3) or the like. The OSD combination unit 5 performs operation in the following three patterns, according to a command inputted from the control unit 9. That is, if an image signal is being outputted from the decoder 4, the OSD combination unit 5 may combine this image signal with the OSD 51, and outputs the combined result to the output unit 6. Or, the OSD combination unit 5 may prohibit the output of this image signal, and only output the OSD 51. Or, the OSD combination unit 5 may output this image signal just as it is to the output unit 6.

The output unit 6 outputs the image signal to the display unit 102 and the audio signal to the speaker 101, in synchronization with one another. At this time, the output unit 6 may output both these signals in analog form via an RCA pin cable after having performed D/A conversion upon them, or may alternatively output them in digital form via an HDMI terminal or the like.

The actuation unit 7 comprises a plurality of actuation keys 71 which are provided to the replay device 1, and a remote control optical reception unit 74 which receives control codes which are transmitted from a remote control 75. The plurality of actuation keys 71 may, for example, include a select key 72, a confirm key 73. And the remote control 75 may, for example, be likewise provided with a select key 76 and a confirm key 77.

The actuation unit 7 outputs to the control unit 9 control codes corresponding to keys actuated by the user, or control codes which have been received by the remote control optical reception unit. And the control unit 9 decides upon the actuation that the user has performed for the replay device 1, according to the signal outputted from the actuation unit 7.

The control unit 9 may, for example, comprise a microcomputer. The control unit 9 also comprises a ROM and a RAM which store control data. The ROM of the control unit 9 stores programs for executing management processing 91, menu screen output processing 92, and replay processing 93. And the control unit 9 controls the operation of the various sections of the replay device 1 on the basis of the control codes received by the actuation unit 7.

A flash memory 99 stores data for initial settings, in which may be stored, for example, the state of the replay device 1 and setting information for the replay device 1. This initial setting data is updated when the user performs a predetermined actuation upon the actuation unit 7 so as to display an initial setting menu screen, and then performs predetermined settings upon this initial setting menu screen.

The management processing 91 will now be explained with reference to FIG. 2. The control unit 9 executes this management processing 91 when the replay device 1 is started, or when a command for display of a file menu screen has been issued. First, the control unit 9 searches for all the files 100 which are recorded upon the medium 10, and ascertains the total number thereof. Then, for all the files which are recorded upon the medium 10, the control unit 9 decides whether or not they are is DMF files. The way this decision is performed is that it is decided that a file is a DMF file, only if the Version ID of the "MENU" chunk of the internal file structure is "1". Now it would also be acceptable, during implementation, to arrange to perform this decision according to the extension which appears at the tail end of the file name. However, since this extension can be rewritten simply and easily, accordingly it is more reliable to decide whether or not a file is a DMF file according to its Version ID.

By doing this, the control unit 9 can manage all of the files 100 by separating them into DMF files 105 and second files 106 in which data is recorded in some format other than that of the DMF files 105. However, for this management method, it would also be acceptable to separate the files by folders, or to construct a list which sets up a correspondence on the basis of their file names.

Next, the menu screen output processing 92 will be explained with reference to FIG. 3. When the replay device 1 starts, or when a command is issued to the replay device 1 for replay of a file, the replay device 1 outputs either the first menu screen 511 or the second menu screen 512 upon the display unit 102. Due to this, the display unit 102 displays either the first menu screen 511 or the second menu screen 512 (refer to FIG. 3). The first menu screen 511 is a screen which shows a list of the DMF files 105. And the second menu screen 512 is a screen which shows a list of the second files 106. While the first menu screen 511 or the second menu screen 512 is being displayed, the replay device receives from the actuation unit 7 selection of a file which is to be replayed.

First, the first menu screen 511 will be explained. A list of the DMF files 105 is displayed in a file selection field 54 of this first menu screen 511 as six thumbnails 541 through 546. Here, the replay device 1 displays this information on the basis of thumbnails, since menu screen information is recorded in the DMF files 105. The user can simply and easily ascertain the contents of the DMF files by looking at these thumbnails 541 through 546.

And the user selects a single DMF file which is to be replayed using the select key 72 or the select key 76 of the actuation unit 7, and presses the confirm key 73 or the confirm key 77. When he does this, the replay device 1 starts replay of the single DMF file which has been selected. And, when the replay ends, the replay device 1 returns back to the first menu screen 511 for a second time. Returning to the menu screen in this manner is defined in the DMF standard.

Moreover, to interrupt the replay of a DMF file 105 while it is being replayed and to replay a second file, is contrary to the definition of the DMF standard. However, to shift to replay processing of a second file 106 while the first menu screen 511 related to the DMF files is being displayed, is not contrary to the definition of the DMF standard that "A list of the DMF files must be displayed before replaying a DMF file and after replay thereof has ended".

Thus, the replay device 1 receives selection, by the select key 72 or the select key 76 of the actuation unit 7, of either the normal tab 52 for displaying the second menu screen 512, or the DMF tab 53 for displaying the first menu screen 511. If, in the state with the normal tab 52 being selected, the user presses either of the confirm keys 73 and 77, then the replay device 1 shifts to display of the second menu screen 512.

Next, the second menu screen 512 will be explained. A list of all of the files which are not DMF files is displayed in a file selection field 54 of this second menu screen 512. As the method for display here, it would be acceptable to display a list of file names as in the case of the second menu screen 512 shown in FIG. 3, or it would also be acceptable to display this list using thumbnails, in a similar manner to the case of the first menu screen 511 described above. Moreover, when the DMF tab 53 is selected upon this second menu screen 512, then the display shifts to the first menu screen 511.

Since the structure described above is provided, the user is able to identify the DMF files and the files which have other formats in a simple manner. Accordingly the convenience of use from the point of view of the user is enhanced.

It should be understood that it would also be acceptable for whether or not changing over from the first menu screen 511 to the second menu screen 512 is prohibited, to be set by the user upon the initial setting screen. By doing this, the user is able to set whether or not to prohibit changing over from the first menu screen 511 to the second menu screen 512, according to his own method of use. Accordingly the convenience of use from the point of view of the user is enhanced by yet a further level.

Figure 4:
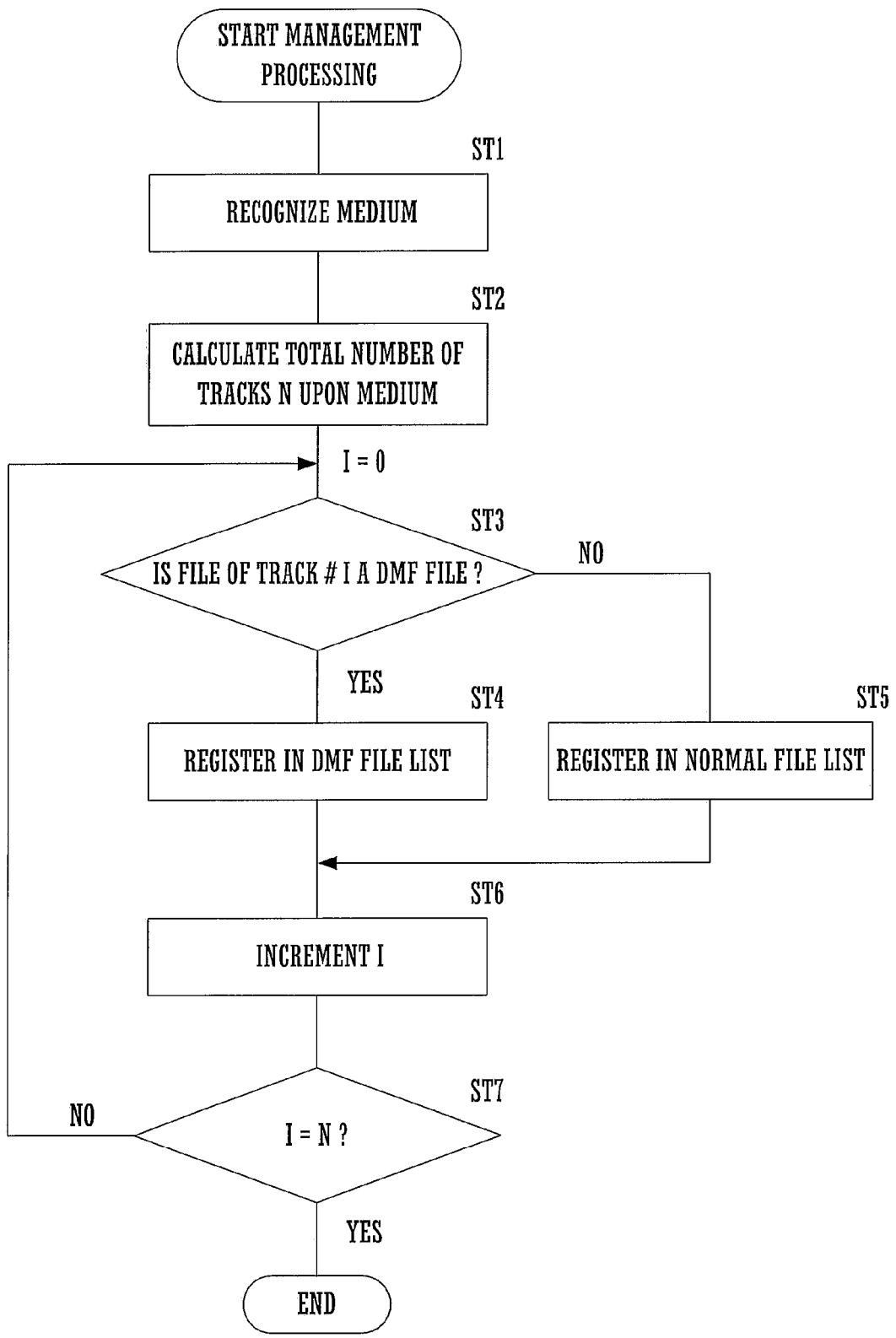
FIG. 4 is a flow chart showing management processing which is performed by a control unit of this replay device which is an embodiment of the present invention.

Next, the management processing 91 performed by the control unit 9 of this replay device 1 will be explained with reference to the flow chart of FIG. 4. If the medium 10 is an optical disk or a semiconductor memory, then this management processing 91 is performed when the medium 10 is loaded. Moreover, if the medium 10 is a hard disk, then this management processing 91 is performed when the replay device 1 starts.

First, the control unit 9 recognizes the medium 10 (a step ST1).

Next, the control unit 9 counts the total number of tracks upon the medium 10 (a step ST2). In this embodiment, this total number will be supposed to be an integer n. The following steps ST3 through ST6 are repeated for i=0 through n−1, using a count variable (which here is i) to count the number of repetitions.

The control unit 9 decides whether or not the file of track # i is a DMF file (a step ST3). And, if the control unit 9 decides that the file of track # i is a DMF file (YES in the step ST3), then it registers that file in a file list of the DMF files 105 (a step ST4). It would also be acceptable to create a folder of the DMF files 105, and to store the file of track # i in that folder in this step ST4.

On the other hand, if the control unit 9 decides that the file of track # i is not a DMF file (NO in the step ST3), then it registers that file in a file list of the second files 106 (a step ST5). It would also be acceptable to create a folder of the second files 106, and to store the file of track # i in that folder in this step ST5.

The control unit 9 then increments the track number i (a step ST6), and executes the steps ST3 through ST5 again for the file of the next track number. These processing steps are repeated while i is less than n (NO in a step ST7), so that, as shown in FIG. 2, the DMF files 105 and the second files 106 are separated. Thereafter, when i becomes equal to n (YES in the step ST7), this control flow terminates.

Next, the menu screen output processing 92 performed by the control unit 9 will be explained with reference to the flow chart of FIG. 5.

First, the control unit 9 outputs the second menu screen 512 (a step ST11).

Next, the control unit 9 decides whether or not the DMF tab 53 has been selected (a step ST12). If output screen is changed over to the first menu screen 511 (a step ST13). On the other hand, if the DMF tab 53 has not been selected (NO in the step ST12), then a selection is received from this second menu screen 512 of a second file 106 to be replayed (a step ST14). Thus, when the second file 106 to be replayed has been selected, the control unit 9 replays that second file 106 (a step ST15). And, when this replay ends, the control unit 9 returns to the step ST11 and displays the second menu screen 512 again.

On the other hand, the control unit 9 receives selection of a DMF file 105 to be replayed from the first menu screen 511 (a step ST16). Thus, when the DMF file 105 to be replayed has been selected, the control unit 9 replays that DMF file 105 (a step ST17).

And the control unit 9 prohibits the display of the second menu screen 512 (a step ST18). Since, due to this, it is impossible to shift to the second menu screen 512 during replay, accordingly the first menu screen is certainly displayed after the replay ends, which is in accordance with the DMF definition.

It should be understood that, as the method of prohibiting the display of the second menu screen 512 in the step ST18, for example, the method may be used of raising in advance a predetermined prohibition flag in the setting data within the flash memory 99. With this method, the control unit 9 refers to this prohibition flag when executing the menu screen output processing 92 to display the second menu screen 512, and thereby determines whether or not display of the second menu screen 512 is prohibited.

After the step ST18, the control unit 9 decides whether or not the replay of the DMF file 105 has ended (a step ST19). And, if the replay of the DMF file 105 has ended (YES in the step ST19), then the control unit 9 proceeds to the step ST20. But, if the replay of the DMF file 105 has not ended (NO in the step ST19), then the control unit 9 continues to replay the DMF file 105.

In the step ST20, the control unit 9 displays the first menu screen as defined by the DMF definition, since the replay has ended.

And the control unit 9 then receives selection of the second menu screen 512 (a step ST21). If selection of the second menu screen 512 has been received (YES in the step ST21), then the control unit 9 returns to the step ST11, and displays the second menu screen 512. But, if selection of the second menu screen 512 has not been received (NO in the step ST21), then the control unit 9 transfers the flow of control to the step ST16.

It should be understood that, in the steps ST12 and ST19, the replay device 1 displays a menu screen of the files which can be replayed, and receives the replay command for a file in the steps ST14 and ST16 simultaneously with these steps. Accordingly, the sequence in which the control unit 9 decides upon the input from the actuation unit 7 may be simultaneously, or may be in the reverse order to that shown. Moreover, although the flow shown in FIG. 5 is an infinite loop, it would also be acceptable to receive some input from the actuation unit 7 in order to escape from this loop. However, during the replay of a DMF file 105 in the step ST17, it would be necessary to ensure that the above described definition of the DMF format is not violated.

The embodiment described above may be supplemented as follows.

While, in the explanation of FIG. 1, a separate block was explained for each function, in actual implementation, it would be acceptable to provide a structure in which a plurality of functions were provided by a single integrated IC. Conversely, it would also be acceptable to arrange to separate one of the shown blocks into a plurality of separate structures. Moreover, a portion of the functions within one of the blocks shown in FIG. 1 might also be integrated with a portion of the functions in some other block.

Furthermore, as the actuation unit 7, either the remote control 75 and the actuation keys 71 may be provided; there is no need to provide them both. And it would be acceptable to provide actuation keys 71 and/or a remote control 75 of a contact type, or of a button type.

Moreover, for the flash memory 99, it would be acceptable for this to be provided internally to the microcomputer of the control unit 9, or alternatively it could be connected externally to the control unit 9. Instead of the flash memory 99, the medium 10 could also be employed for this storage. And the flash memory 99 need not be directly connected to the control unit 9, provided that it can be accessed indirectly by the control unit 9.

Even further, in the above explanation, the first files were taken as being DMF files. However, even for files other than DMF files, the embodiment described above can be applied, provided that they are files according to a format for which "A file list must be displayed before replay of a file and after replay has ended.".

Figure 2:
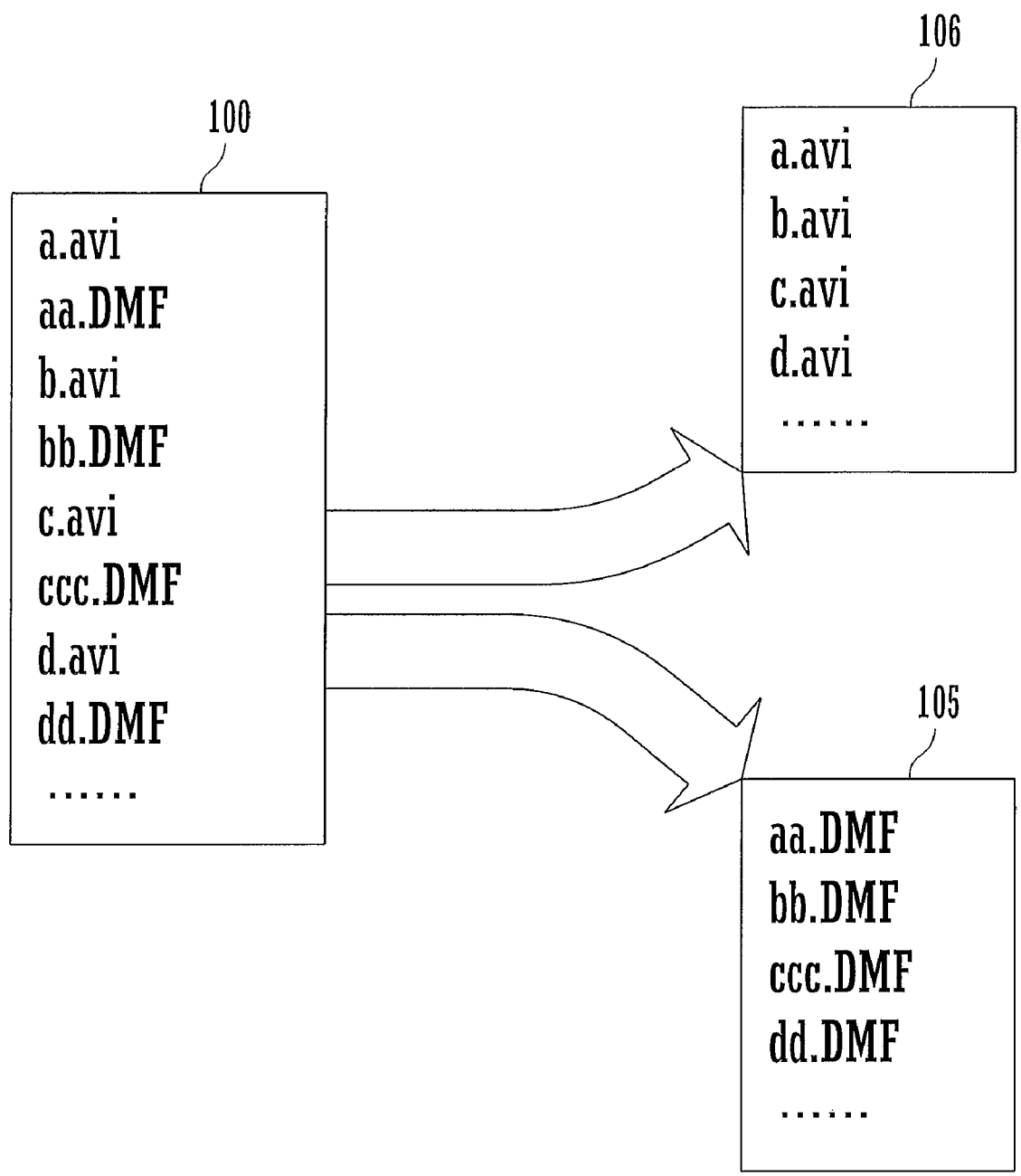
FIG. 2 is a figure for explanation of file management performed during management processing by this replay device which is an embodiment of the present invention.

Yet further, while in FIG. 2 the second files 106 (i.e. the files other than the DMF files) are shown as being of the .AVI file type, they may also be image files such as .WMV files or .MP4 files or the like, or audio files such as .MP3 files or .WAV files or the like.

Figure 3:
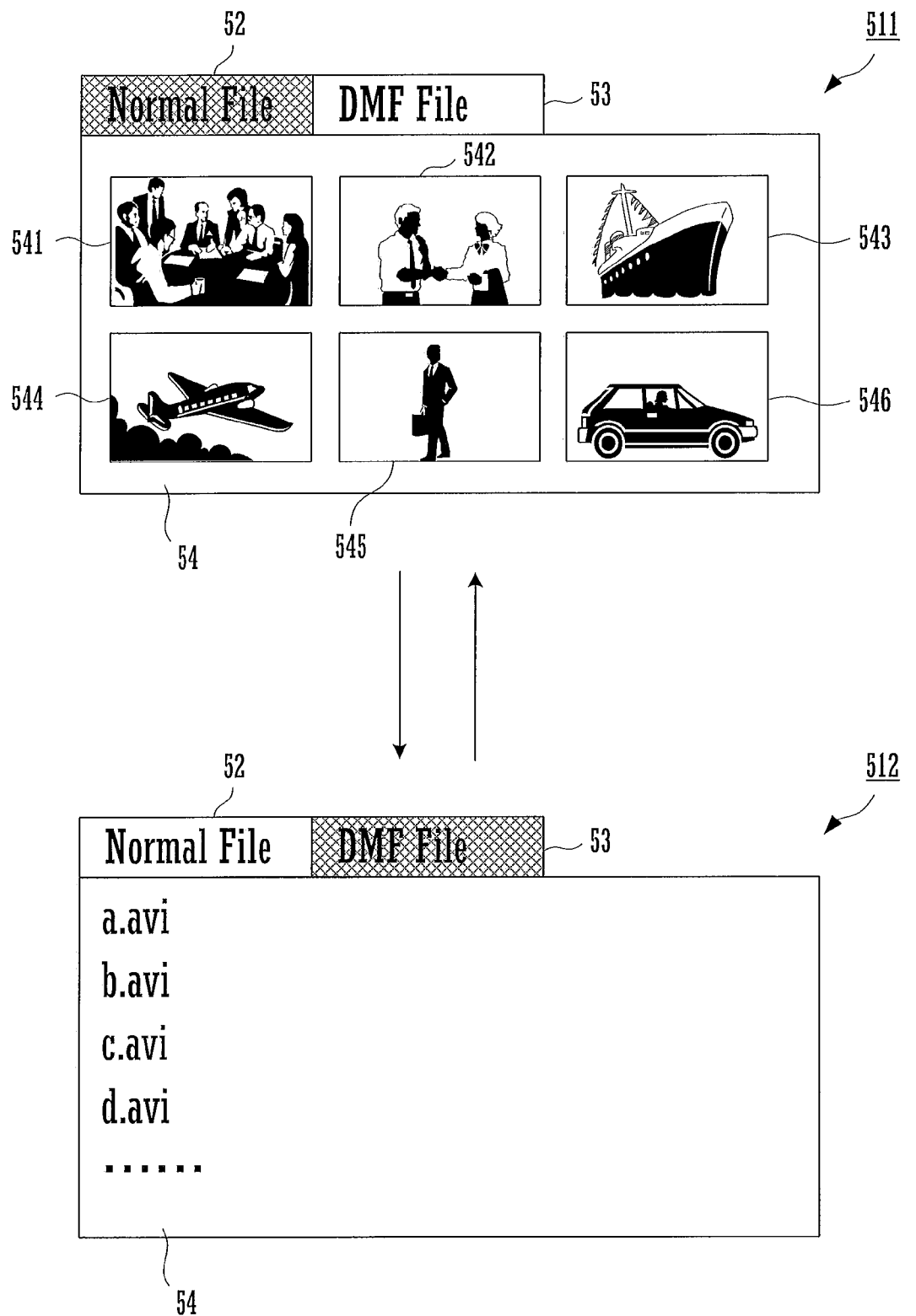
FIG. 3 is a figure showing an example of a menu screen which is outputted by this replay device which is an embodiment of the present invention during menu screen output processing.

Still further, while six thumbnail images were shown in FIG. 3 as being displayed, it would also be acceptable for some other number to be displayed. And the first menu screen 511 shown in FIG. 3 has only been given by way of example; a menu screen of any structure will be acceptable, provided that a file can be selected thereupon. Moreover, it would also be acceptable to arrange the files on the second menu screen 512 as classified by file format (.WMV, .MP4, .MP3, .WAV and so on).

Figure 5:
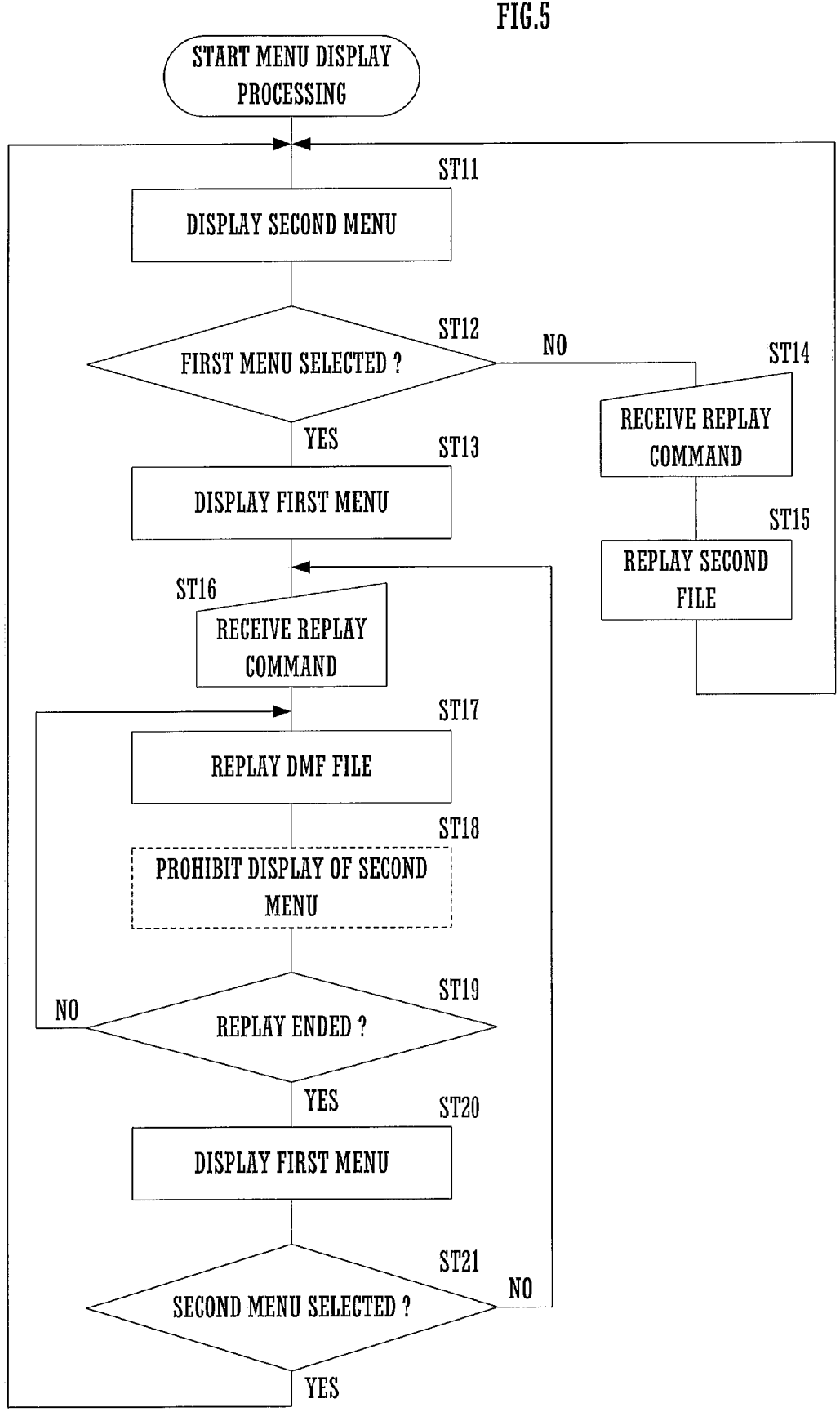
FIG. 5 is a flow chart showing menu screen output processing performed by this control unit of the replay device which is an embodiment of the present invention.

Finally while, in FIG. 5, in the initial step ST11, it was arranged to display the second files 106, in actual implementation, it would also be acceptable to display a list of the DMF files 105 as well. The DMF files 105 and the second files 106 may also be displayed separately.

What is claimed is:

1. A device for the bifurcated display of replay menus separating digital media files by file formats, comprising:

management means which manages all of the files stored upon a medium by separating the files into first files in which image data is recorded in a first format and second files in which data is recorded in a second format other than the first format, the first format being a format in which it is defined that a list of the first files is displayed before replay of a first file of the first files and after replay of the first file has ended, and that to interrupt the replay of the first file while it is being replayed and to replay a second file of the second files is prohibited;

output means which, on the basis of the file management by the management means, creates and outputs at least one of a first menu screen upon which a list of the first files is shown, and a second menu screen upon which a list of the second files is shown;

selection means which receives a selection of one of the first files to be replayed from the first menu screen, or receives a selection of one of the second files to be replayed from the second menu screen;

replay means which replays the first file or the second file which has been selected by the selection means; and initial setting means upon which is set whether or not to prohibit changing over from the first menu screen to the second menu screen by the output means, wherein the output means creates and outputs, together with the first menu screen, a tab image showing a tab for changing over from the first menu screen to the second menu screen, wherein when receiving a predetermined actuation input during outputting the first menu screen and the tab image, the output means changes over from the first menu screen to the second menu screen, and wherein when the replay means is replaying the first file, the output means prohibits the output of the second menu screen.

2. The device for the bifurcated display of replay menus separating digital media files by file formats according to claim 1, wherein the first menu screen is a screen which displays the list of the first files as thumbnail images.

* * * * *